(12) United States Patent
Nalluri et al.

(10) Patent No.: US 12,010,091 B2
(45) Date of Patent: Jun. 11, 2024

(54) TOPIC HANDLING IN MQTT NETWORKS (71) Applicant: Telefonaktiebolaget LM Ericsson (publ), Stockholm (SE)

(72) Inventors: Srinivasa Rao Nalluri, Bangalore (IN); Ari Keränen, Helsinki (FI)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 213 days.

(21) Appl. No.: 16/611,741

(22) PCT Filed: May 15, 2017

(86) PCT No.: PCT/EP2017/061595
§ 371 (c)(1),
(2) Date: Nov. 7, 2019

(87) PCT Pub. No.: WO2018/210401
PCT Pub. Date: Nov. 22, 2018

(65) Prior Publication Data
US 2020/0112539 A1 Apr. 9, 2020

(51) Int. Cl.
*H04L 61/5014* (2022.01)
*H04L 67/10* (2022.01)
*H04L 67/12* (2022.01)
*H04W 8/26* (2009.01)
*H04W 80/04* (2009.01)

(52) U.S. Cl.
CPC .......... *H04L 61/5014* (2022.05); *H04L 67/10* (2013.01); *H04L 67/12* (2013.01); *H04W 8/26* (2013.01); *H04W 80/04* (2013.01)

(58) Field of Classification Search
CPC ..... H04L 61/2015; H04L 67/10; H04L 67/12; H04W 4/70; H04W 8/26; H04W 80/04
See application file for complete search history.

(56) References Cited

U.S. PATENT DOCUMENTS

| 2006/0176847 | A1* | 8/2006 | Chen | H04L 61/00 370/328 |
| 2016/0246638 | A1* | 8/2016 | Rinta-Aho | G06F 9/5055 |
| 2016/0337181 | A1* | 11/2016 | Cathrow | H04L 63/123 |
| 2017/0332421 | A1* | 11/2017 | Sternberg | H04W 12/069 |
| 2018/0189303 | A1* | 7/2018 | Mankovskii | G06Q 10/06 |

OTHER PUBLICATIONS

HiveMQ Team, MQTT Essentials, parts 1, 2, and 4 published in 2015, https://www.hivemq.com/mqtt-essentials/ (links to parts 1-5 and more) (Year: 2015).*

(Continued)

*Primary Examiner* — Zi Ye
*Assistant Examiner* — Xiang Yu
(74) *Attorney, Agent, or Firm* — Rothwell, Figg, Ernst & Manbeck, P.C.

(57) ABSTRACT

There is provided mechanisms for configuring an MQTT client node with a topic prefix. A method is performed by the MQTT client node. The method comprises sending a request to a DHCP server for configuration. The method comprises receiving a response from the DHCP server. The response comprises configuration information and at least one prefix string defining the topic prefix to be used together with a topic by the MQTT client node when publishing data on said topic.

9 Claims, 8 Drawing Sheets (56) References Cited

OTHER PUBLICATIONS

HiveMQ Team, MQTT Essentials, parts 1, 2, 4 and 5 published in 2015, https://www.hivemq.com/mqtt-essentials/ (links to parts 1-5 and more) (Year: 2015).*

MQTT v 3.1.1 OASIS standard, published in Oct. 2014, http://docs.oasis-open.org/mqtt/mqtt/v3.1.1/os/mqtt-v3.1.1-os.html (section 4.7 on Topic Names and Filters) (Year: 2014).*

International Search Report and the Written Opinion of the International Searching Authority, issued in corresponding International Application No. PCT/EP2017/061595, dated Oct. 4, 2017, 17 pages.

Stanford-Clark et al. "MQTT For Sensor Networks (MQTT-SN) Protocol Specification" Version 1.2, Nov. 14, 2013, 28 pages.

Hunkeler et al. "MQTT-S—A Publish/Subscribe Protocol For Wireless Sensor Networks" Communication Systems Software And Middleware And Workshops, 2008, Comsware 2008, 3rd International Conference, IEEE, Piscataway, NJ, USA, Jan. 6, 2008, pp. 791-798.

* cited by examiner

TOPIC HANDLING IN MQTT NETWORKS

CROSS REFERENCE TO RELATED APPLICATION(S)

This application is a 35 U.S.C. § 371 National Phase Entry Application from PCT/EP2017/061595, filed May 15, 2017, designating the United States, the disclosure of which is incorporated herein by reference in its entirety.

TECHNICAL FIELD

Embodiments presented herein relate to a method, an MQTT client node, a computer program, and a computer program product for configuring the MQTT client node with a topic prefix. Further embodiments presented herein relate to a method, a DHCP server, a computer program, and a computer program product for configuring the MQTT client node with a topic prefix. Further embodiments presented herein relate to a method, an MQTT broker node, a computer program, and a computer program product for verifying the MQTT client node's right to publish.

BACKGROUND

The Internet-of-Things (IoT) is generally referred to as a network of physical smart objects such as sensors that exchange information with other sensors, devices or servers, without human interaction. As such, these devices are sometimes referred to as machine-to-machine (M2M) devices. Some examples of services in IoT include built-in sensors in automobiles or homes, heart monitoring implants or smart thermostats systems. Many new protocols have been developed after the introduction of IoT including Lightweight Machine to Machine protocol (LWM2M) and constrained application protocol (CoAP), both of which are light and compact application protocols.

M2M devices may communicate with other M2M devices and systems using wireless or wired technology. Regarding wireless technologies, M2M devices may support short range communication technologies such as Bluetooth, Wi-Fi and Zigbee. They may also support long range radio technologies, however this is often more power consuming than short range communication.

The Message Queue Telemetry Transport (MQTT) protocol is a light-weight IoT protocol, based on the publish/subscribe communication model. MQTT clients, that can be publishers or subscribers, communicate with each other via a broker. The broker hosts a set of "topics" and clients can publish and subscribe to these topics. All data sent (published) to a topic is delivered to all clients who are subscribed to the same topic. In communications network using MQTT clients commonly use a preconfigured address information, such as Uniform Resource Identifier (URI), to register with a MQTT broker. The URI might be configured by a user or an operator through a local device interface. Alternatively, the URI might be provided as a hardcoded value during manufacturing of the MQTT clients. An MQTT client might run either in a gateway or in an M2M device.

Subscribers who are interested in specific data of a specific topic registers the topic with the MQTT broker. MQTT clients acting as publishers register/create topics, and MQTT clients acting as subscribers register for a specific existing topic. In general terms, a topic can represented by a hierarchical string defined by MQTT service or device operator. Before operation every MQTT client that wishes to publish data on a specific topic should be aware of the corresponding hierarchical strings that are supposed to be used for the topics for the MQTT client to publish topic specific data.

However, uniqueness of topics in the MQTT network is not guaranteed as there is no standard guideline that guarantees uniqueness. In the same MQTT network, using the same MQTT broker, different MQTT clients can accidentally use the same topic to publish data, which results in invalid operation. In such scenarios, subscribers might receive wrong data and publishers may change data they were not supposed to change. Network or device operators therefore have to take care of the topic name space across the MQTT network so that topic identities are unique across the MQTT network. This manual operation is error-prone and costly.

Hence, there is still a need for an improved handling of topics in MQTT networks.

SUMMARY

An object of embodiments herein is to provide efficient handling of topics in MQTT networks, eliminating, or at least reducing the issues mentioned above.

According to a first aspect there is presented a method for configuring an MQTT client node with a topic prefix. The method is performed by the MQTT client node. The method comprises sending a request to a DHCP server for configuration. The method comprises receiving a response from the DHCP server. The response comprises configuration information and at least one prefix string defining the topic prefix to be used together with a topic by the MQTT client node when publishing data on said topic.

According to a second aspect there is presented an MQTT client node for configuring the MQTT client node with a topic prefix. The MQTT client node comprises processing circuitry. The processing circuitry is configured to cause the MQTT client node to send a request to a DHCP server for configuration. The processing circuitry is configured to cause the MQTT client node to receive a response from the DHCP server. The response comprises configuration information and at least one prefix string defining the topic prefix to be used together with a topic by the MQTT client node when publishing data on said topic.

According to a third aspect there is presented an MQTT client node for configuring the MQTT client node with a topic prefix. The MQTT client node comprises processing circuitry and a storage medium. The storage medium stores instructions that, when executed by the processing circuitry, cause the MQTT client node to perform operations, or steps. The operations, or steps, cause the MQTT client node to send a request to a DHCP server for configuration. The operations, or steps, cause the MQTT client node to receive a response from the DHCP server. The response comprises configuration information and at least one prefix string defining the topic prefix to be used together with a topic by the MQTT client node when publishing data on said topic.

According to a fourth aspect there is presented an MQTT client node for configuring the MQTT client node with a topic prefix. The MQTT client node comprises a send module configured to send a request to a DHCP server for configuration. The MQTT client node comprises a receive module configured to receive a response from the DHCP server. The response comprises configuration information and at least one prefix string defining the topic prefix to be used together with a topic by the MQTT client node when publishing data on said topic.

According to a fifth aspect there is presented a computer program for configuring the MQTT client node with a topic prefix. The computer program comprises computer program code which, when run on processing circuitry of an MQTT client node, causes the MQTT client node to perform a method according to the first aspect.

According to a sixth aspect there is presented a method for configuring an MQTT client node with a topic prefix. The method is performed by a DHCP server. The method comprises receiving a request from the MQTT client node for configuration. The method comprises sending a response to the MQTT client node. The response comprises at least configuration data as assigned to the MQTT client node and at least one prefix string defining the topic prefix to be used together with a topic by the MQTT client node when publishing data on said topic.

According to a seventh aspect there is presented a DHCP server for configuring an MQTT client node with a topic prefix. The DHCP server comprises processing circuitry. The processing circuitry is configured to cause the DHCP server to receive a request from the MQTT client node for configuration. The processing circuitry is configured to cause the DHCP server to send a response to the MQTT client node. The response comprises at least configuration data as assigned to the MQTT client node and at least one prefix string defining the topic prefix to be used together with a topic by the MQTT client node when publishing data on said topic.

According to an eighth aspect there is presented a DHCP server for configuring an MQTT client node with a topic prefix. The DHCP server comprises processing circuitry and a storage medium. The storage medium stores instructions that, when executed by the processing circuitry, cause the DHCP server to perform operations, or steps. The operations, or steps, cause the DHCP server to receive a request from the MQTT client node for configuration. The operations, or steps, cause the DHCP server to send a response to the MQTT client node. The response comprises at least configuration data as assigned to the MQTT client node and at least one prefix string defining the topic prefix to be used together with a topic by the MQTT client node when publishing data on said topic.

According to a ninth aspect there is presented a DHCP server for configuring an MQTT client node with a topic prefix. The DHCP server comprises a receive module configured to receive a request from the MQTT client node for configuration. The DHCP server comprises a send module configured to send a response to the MQTT client node. The response comprises at least configuration data as assigned to the MQTT client node and at least one prefix string defining the topic prefix to be used together with a topic by the MQTT client node when publishing data on said topic.

According to a tenth aspect there is presented a computer program for configuring the MQTT client node with a topic prefix. The computer program comprises computer program code which, when run on processing circuitry of a DHCP server, causes the DHCP server to perform a method according to the sixth aspect.

Advantageously these methods, these MQTT client nodes, these DHCP servers, and these computer programs provide efficient handling of topics in MQTT networks, eliminating, or at least reducing the issues mentioned above.

Advantageously these methods, these MQTT client nodes, these DHCP servers, and these computer programs prevent namespace collisions for topics by re-using and adapting network infrastructure configuration mechanisms to also configure the topic name space.

According to an eleventh aspect there is presented a method for verifying right to publish. The method is performed by an MQTT broker node. The method comprises receiving a request for publishing data on a topic from an MQTT client node. The request comprises a prefix string. The method comprises validating said prefix string together with an identity of the MQTT client node in order to verify whether said MQTT client node is allowed to publish data on said topic or not.

According to a twelfth aspect there is presented an MQTT broker node for verifying an MQTT client node's right to publish. The MQTT broker node comprises processing circuitry. The processing circuitry is configured to cause the MQTT broker node to receive a request for publishing data on a topic from an MQTT client node. The request comprises a prefix string. The processing circuitry is configured to cause the MQTT broker node to validate said prefix string together with an identity of the MQTT client node in order to verify whether said MQTT client node is allowed to publish data on said topic or not.

According to a thirteenth aspect there is presented an MQTT broker node for verifying an MQTT client node's right to publish. The MQTT broker node comprises processing circuitry and a storage medium. The storage medium stores instructions that, when executed by the processing circuitry, cause the MQTT broker node to perform operations, or steps. The operations, or steps, cause the MQTT broker node to receive a request for publishing data on a topic from an MQTT client node. The request comprises a prefix string. The operations, or steps, cause the MQTT broker node to validate said prefix string together with an identity of the MQTT client node in order to verify whether said MQTT client node is allowed to publish data on said topic or not.

According to a fourteenth aspect there is presented an MQTT broker node for verifying an MQTT client node's right to publish. The MQTT broker node comprises a receive module configured to receive a request for publishing data on a topic from an MQTT client node. The request comprises a prefix string. The MQTT broker node comprises a validate module configured to validate said prefix string together with an identity of the MQTT client node in order to verify whether said MQTT client node is allowed to publish data on said topic or not.

According to a fifteenth aspect there is presented a computer program for verifying an MQTT client node's right to publish, the computer program comprising computer program code which, when run on processing circuitry of an MQTT broker node, causes the MQTT broker node to perform a method according to the eleventh aspect.

Advantageously these methods, these MQTT broker nodes, and this computer program provide efficient detection of malicious MQTT client nodes.

Advantageously these methods, these MQTT broker nodes, and this computer program prevent a malicious MQTT client node from publishing data.

According to a sixteenth aspect there is presented a computer program product comprising a computer program according to at least one of the fifth aspect, the tenth aspect, and the fifteenth aspect and a computer readable storage medium on which the computer program is stored. The computer readable storage medium can be a non-transitory computer readable storage medium.

It is to be noted that any feature of the first, second, third, fourth, fifth, sixth seventh, eight, ninth, tenth, eleventh, twelfth, thirteen, fourteenth, fifteenth and sixteenth aspects may be applied to any other aspect, wherever appropriate.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

The term M2M device used herein should be understood to be any device which is configured or configurable to communicate with another device, server or system without human interaction. The M2M device may for example be a sensor for light, pressure, temperature, vibration or actuators. The M2M device may form part of an apparatus such as a vehicle, an appliance (including a fridge, freezer or central heating), or a user equipment (such as a mobile phone, laptop, smart phone, wireless communication device).

The term gateway used herein is a network point or node that acts as an entrance to another network. It controls traffic to and from the network which it acts as a gateway for. A gateway may be considered to have the functions of a router in that it knows where to direct a given packet of data, and a switch, which furnishes the actual path in and out of the gateway for a given packet.

In some aspects, a client receiving a prefix of Internet Protocol addresses can be considered to be a gateway. The gateway configures and assigns an Internet Protocol address to M2M devices which form part of its local network. The gateway also receives a Uniform Resource Identifier together with the prefix of Internet protocol addresses and forwards the Uniform Resource Identifier to the M2M devices.

Some of the herein disclosed embodiments make use of the dynamic host configuration protocol (DHCP). DHCP is an Internet application protocol that uses a client/server model to communicate between hosts. DHCP executes over the User Datagram Protocol (UDP) transport protocol. It provides a mechanism to auto-configure inter-link Host Internet Protocol addresses, provides parameters to auto-register and receives Domain Name System Host names and provides a mechanism to specify additional configuration options in the protocol.

Figure 1:
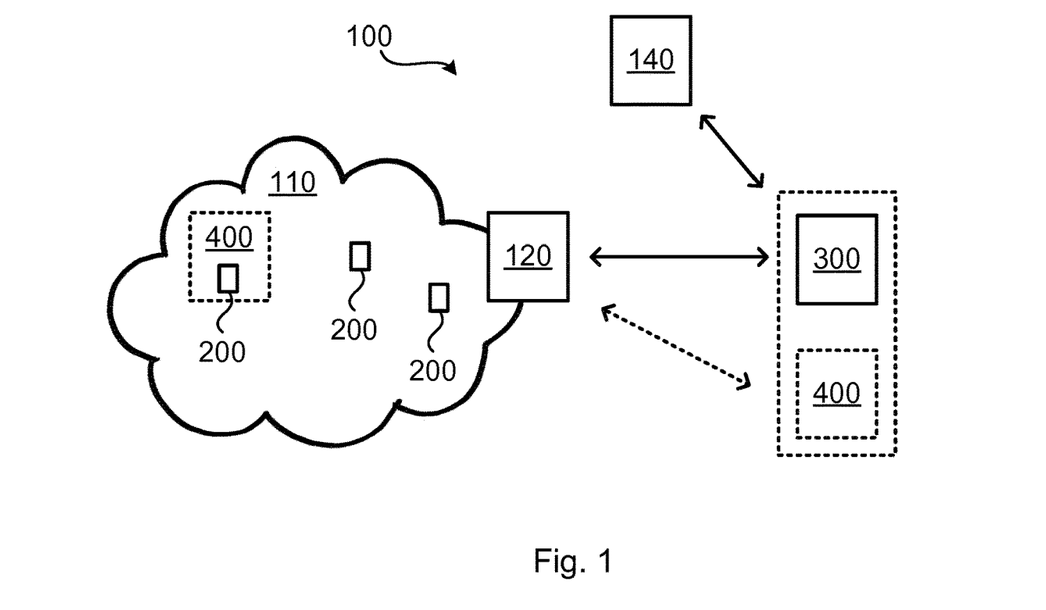
FIG. 1 is a schematic diagram illustrating a communication network according to embodiments.

FIG. 1 is a schematic diagram illustrating a communications network 100 where embodiments presented herein can be applied. A gateway 120 and MQTT client nodes 200 form part of a local network 110. The gateway 120 is configured to communicate with a DHCP server 300, an MQTT broker node 400, and an MQTT service operator node 140. The MQTT broker node 400 may, optionally, be part of the local network 110 and may, optionally, comprise an MQTT client node 200.

As mentioned above, existing mechanisms for taking care of the topic name space across the MQTT network so that topic identities are unique across the MQTT network are error-prone and costly.

Figure 2:
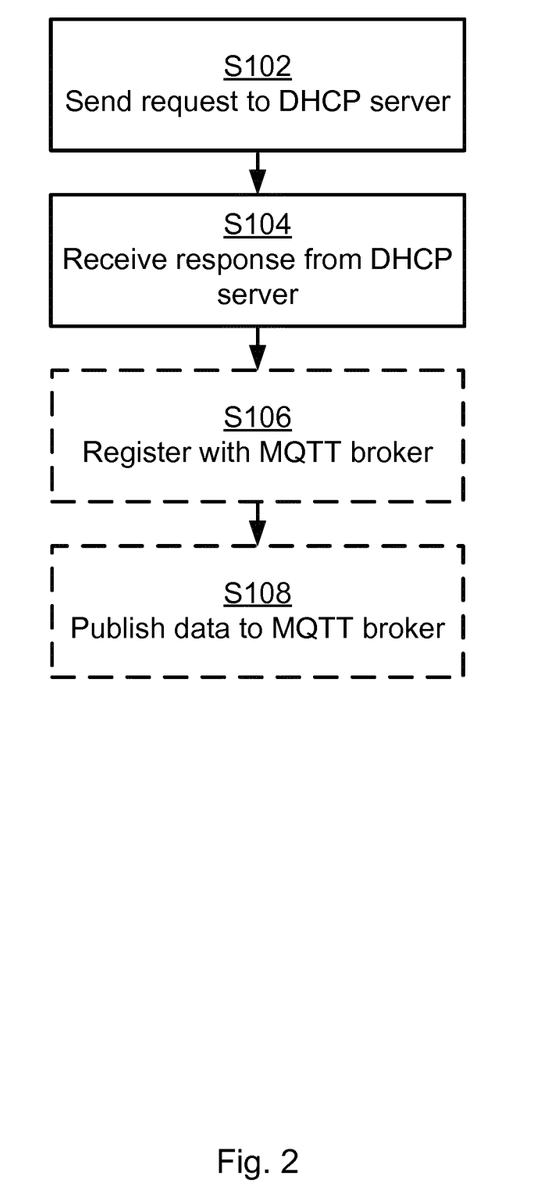
FIGS. 2, 3, and 4 are flowcharts of methods according to embodiments.
Figure 3:
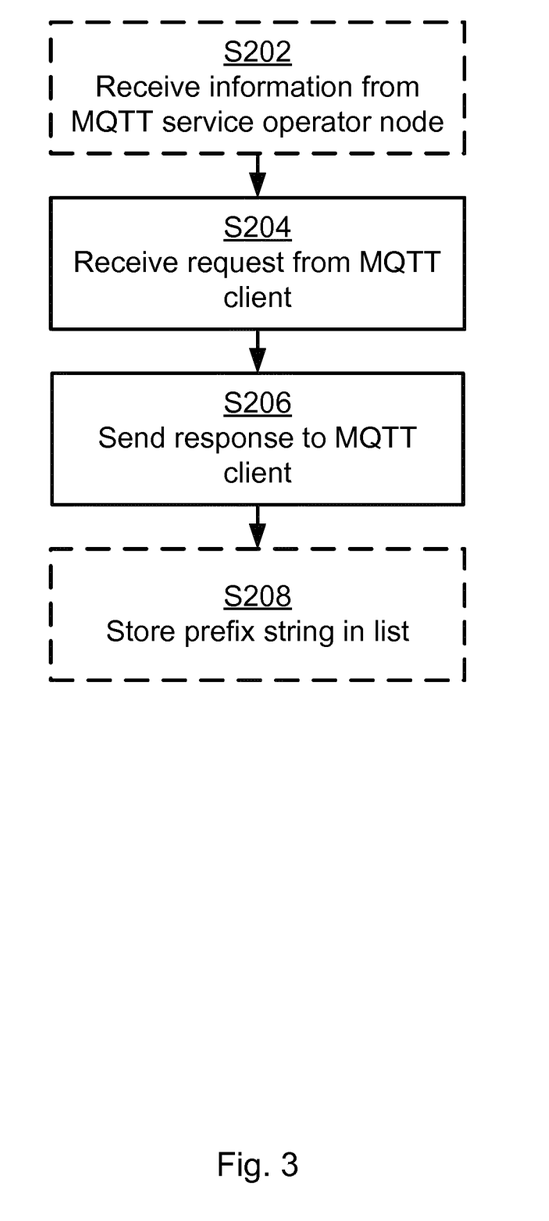

Embodiments disclosed herein thus relate to mechanisms for configuring the MQTT client node 200 with a topic prefix. In order to obtain such mechanisms there is provided an MQTT client node 200, a method performed by the MQTT client node 200, a computer program product comprising code, for example in the form of a computer program, that when run on processing circuitry of the MQTT client node 200, causes the MQTT client node 200 to perform the method. In order to obtain such mechanisms there is further provided a DHCP server 300, a method performed by the DHCP server 300, and a computer program product comprising code, for example in the form of a computer program, that when run on processing circuitry of the DHCP server 300, causes the DHCP server 300 to perform the method. FIG. 2 is a flowchart illustrating embodiments of methods for configuring the MQTT client node 200 with a topic prefix as performed by the MQTT client node 200. FIG. 3 is a flowchart illustrating embodiments of methods for configuring the MQTT client node 200 with a topic prefix as performed by the DHCP server 300.

Figure 4:
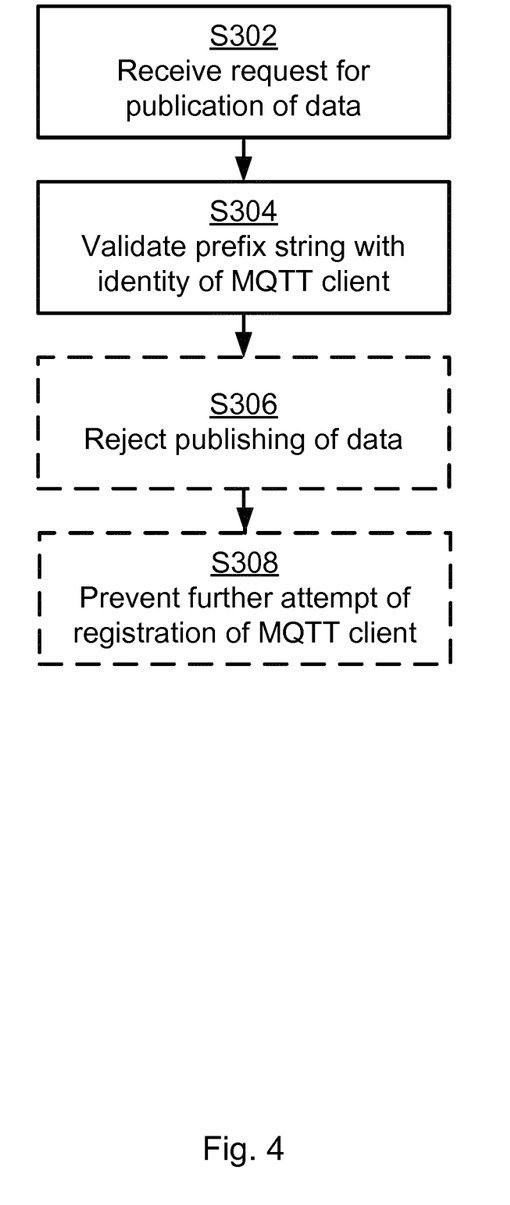

Embodiments disclosed herein further relate to mechanisms for enforcing that the MQTT client node 200 is allowed to publish under a specific topic. There is thus further provided an MQTT broker node 400, a method performed by the MQTT broker node 400, and a computer program product comprising code, for example in the form of a computer program, that when run on processing circuitry of the MQTT broker node 400, causes the MQTT broker node 400 to perform the method. FIG. 4 is a flowchart illustrating embodiments of methods for verifying the MQTT client node's 200 right to publish as performed by the MQTT broker node 400. The methods are advantageously provided as computer programs.

In general terms, the MQTT service operator node 140 configures the DHCP server 300 serving the communications network 100 with MQTT clients 200 with MQTT topic information. If the communications network 100 comprises only entities, nodes, devices, and functions using mechanisms according to the herein disclosed embodiments, the whole topic space can be managed using DHCP. Otherwise, the MQTT service operator node 140 may select a specific root prefix for DHCP managed topic namespace. The MQTT service operator node 140 may also select to map different device media access control (MAC) addresses to different topic prefixes. The MQTT service operator node 140 may further select to configure a specific prefix to each new MQTT clients 200. A cryptographic hash function of a MAC address can be used to generate unique prefix for every publisher.

Reference is now made to FIG. 2 illustrating a method for configuring the MQTT client node 200 with a topic prefix as performed by the MQTT client node 200 according to an embodiment.

It is assumed that the MQTT client node 200 needs configuration and therefore is configured to perform step S102:

S102: The MQTT client node 200 sends a request to the DHCP server 300 for configuration. The configuration could be regarded as network configuration or host configuration, without being limited to network access configuration.

The DHCP server 300 responds to the request by sending a response to the MQTT client node 200. At least some of the herein disclosed embodiments are based on introducing a configuration option in the DHCP and DHCP version 6 (DHCPv6) that will be passed on to MQTT clients 200 upon the request for configuration. Hence, the MQTT client node 200 is configured to perform step S104:

S104: The MQTT client node 200 receives a response from the DHCP server 300. The response comprises configuration information. The response further comprises at least one prefix string. The at least one prefix string is part of the configuration option. The at least one prefix string defines the topic prefix to be used together with a topic by the MQTT client node 200 when publishing data on the topic.

The at least one prefix string is thus to be used by the MQTT client node 200 when acting as a publisher as a prefix to topics on which the MQTT client node 200 publishes data. The DHCP server 300 is thereby enabled to centrally manage the topic namespace and prevent namespace collisions.

Embodiments relating to further details of configuring the MQTT client node 200 with a topic prefix as performed by the MQTT client node 200 will now be disclosed.

There may be different ways to provide the at least one prefix string. According to an embodiment each of the at least one prefix string is provided in an MQTT protocol topic prefix (MQTT_TOPIC_PREFIX) data structure.

In some aspects the MQTT client node 200 registers with the MQTT broker node 400 in order to publish or subscribe to data on one or more topics.

Hence, according to an embodiment the MQTT client node 200 is configured to perform (optional) step S106:

S106: The MQTT client node 200 registers with the MQTT broker node 400 for at least one of publishing and subscribing to data at least on said topic.

The MQTT client node 200 then uses one of the received topic prefixes as prefix to a topic on which it publishes data. Hence, according to an embodiment the MQTT client node 200 is configured to perform (optional) step S108:

S108: The MQTT client node 200 publishes, to the MQTT broker node 400, data on the topic using the prefix string as prefix to the topic.

There could be different aspects of the uniqueness of the prefix string.

According to some aspects the prefix string is unique to each MQTT client node 200. That is, according to an embodiment the prefix string is unique for the MQTT client node 200 among all MQTT client nodes having registered with the MQTT broker node 400. In some aspects the uniqueness is guaranteed by the DHCP server 300.

One or more applications may run on each MQTT client node 200. Examples of applications are data collection and reporting functions, such as when the MQTT client node 200 is run on an M2M device. Each of these applications may thus request to publish or subscribe to data of one or more topics. According to some aspects the prefix string is therefore unique for each such application. That is, according to an embodiment a unique prefix string is received for each application run on the MQTT client node 200 that is to publish data or subscribe to data on the topic.

Each M2M device may have one or more users. Each user may be interested in data on one or more of the topics. According to some aspects the prefix string is therefore unique to each user of the M2M device on which the MQTT client node 200 is run. That is, according to an embodiment a unique prefix string is received for each user of the MQTT client node 200.

There could be different types of prefixes.

In some aspects the prefix has two parts; one being the actual prefix and the other identifying the application. Hence, according to an embodiment the prefix string comprises a part identifying the application or user.

In some aspects there is a separate identification of the application. Hence, according to an embodiment identification of the application or user is provided separately from the prefix string.

In some aspects the prefix is cryptographic hash of the MAC address of the MQTT client node 200. Hence, according to an embodiment each of the at least one prefix string is a cryptographic hash of a MAC address of the MQTT client node 200. When two or more MQTT client nodes 200 share the same M2M device (where the MAC address thus belongs to the M2M device), the MQTT client nodes 200 could use a prefix being a combination of the topic prefix and the application identity.

There could be different types of request messages and response messages. Generally, the request could be sent in a DHCP request message, and the response could be received in a DHCP response message. The type of request messages and response messages may depend on the type of DHCP server 300.

Particularly, in an embodiment where the DHCP server 300 is a DHCPv6 server, the request could be sent in a DHCPv6 solicit message, and the response could be received in a DHCPv6 advertise message.

Further, in an embodiment where the DHCP server 300 is a DHCPv4 server, the request could be sent in a DHCPv4 discover message, and the response could be received in a DHCPv4 offer message. It is here noted that what is commonly denoted simply as a DHCPv4 server is in the present disclosure denoted a DHCPv4 server to distinguish it from a DHCPv6 server. Further, the term DHCP server (without any suffix) is in the present disclosure used to denote a server that could implement the functionality of the DHCPv4 server, of the DHCPv6 server, or of both the DHCPv4 and the DHCPv6 server.

Reference is now made to FIG. 3 illustrating a method for configuring the MQTT client node 200 with a topic prefix as performed by the DHCP server 300 according to an embodiment.

As disclosed above, the MQTT client node 200 in step S102 request configuration from the DHCP server 300. Hence, the DHCP server 300 is configured to perform step S204:

S204: The DHCP server 300 receives a request from the MQTT client node 200 for configuration.

As disclosed above, the DHCP server 300 responds to the request and is hence configured to perform step S206:

S206: The DHCP server 300 sends a response to the MQTT client node 200. The response comprises at least configuration data as assigned to the MQTT client node 200 and at least one prefix string defining the topic prefix to be used together with a topic by the MQTT client node 200 when publishing data on said topic.

Embodiments relating to further details of configuring the MQTT client node 200 with a topic prefix as performed by the DHCP server 300 will now be disclosed.

As disclosed above, according to an embodiment each of the at least one prefix string is provided in an MQTT protocol topic prefix (MQTT_TOPIC_PREFIX) data structure.

In some aspects the MQTT service operator node 140 configures the DHCP server 300 with topic information. Hence, according to an embodiment the topic prefix is selected from a set of topic prefixes and the DHCP server 300 is configured to perform (optional) step S202:

S202: The DHCP server 300 receives information from the MQTT service operator node 140. The information pertains to the set of topic prefixes.

In some aspects the information comprises prefix strings and further information (if any) the DHCP server 300 or MQTT client nodes 200 could need to map prefixes to specific MQTT client nodes, or applications, or M2M devices.

In some aspects the DHCP server 300 maintains a list of prefix strings. Hence, according to an embodiment the DHCP server 300 is configured to perform (optional) step S208:

S208: The DHCP server 300 stores the at least one prefix string in a list of prefix strings. The at least one prefix string is mapped to an identity of the MQTT client node 200.

This could guarantee a unique mapping between topic prefixes and MQTT client nodes.

Different aspects of the uniqueness of the prefix string have been disclosed above and are equally applicable to the embodiments relating to the DHCP server 300. Thus, according to an embodiment the MQTT client node 200 is part of a set of MQTT client nodes associated with an MQTT broker node 400, and the prefix string is unique for the MQTT client node 200 among all MQTT client nodes in the set of MQTT client nodes. According to a further embodiment a unique prefix string is sent for each application run on the MQTT client node 200 that is to publish or subscribe to data on the topic. According to a yet further embodiment a unique prefix string is sent for each user of the MQTT client node 200.

Different aspects of types of prefixes have been disclosed above and are equally applicable to the embodiments relating to the DHCP server 300. Thus, according to an embodiment the prefix string comprises a part identifying the application or user. According to a further embodiment identification of the application or user is provided separately from the prefix string.

Different aspects of types of request messages and response messages have been disclosed above and are equally applicable to the embodiments relating to the DHCP server 300. The request could be received in a DHCP request message, and the response could be sent in a DHCP response message.

Further, according to an embodiment where the DHCP server 300 is a DHCPv6 server, the request could be received in a DHCPv6 solicit message, and the response could be sent in a DHCPv6 advertise message. Further, in an embodiment where the DHCP server 300 is a DHCPv4 server, the request could be received in a DHCPv4 discover message, and the response could be sent in a DHCPv4 offer message.

Figure 5:
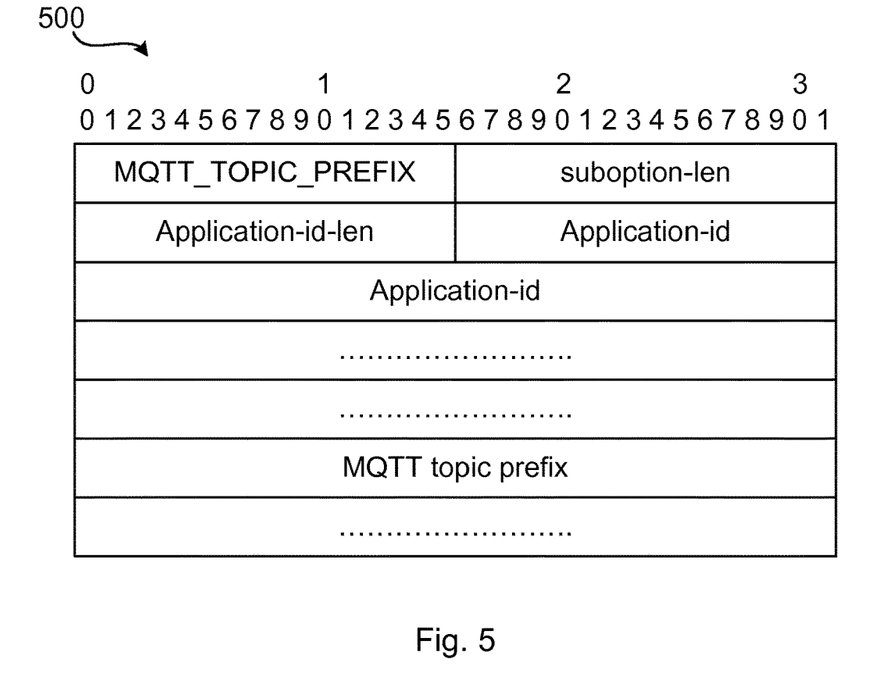
FIGS. 5 and 7 are schematic illustrations of data structures according to embodiments.

FIG. 5 schematically illustrates a data structure 500 of a response (as in steps S104, S206) from the DHCP server 300 according to an embodiment where the DHCP server 300 is a DHCPv6 server.

Figure 6:
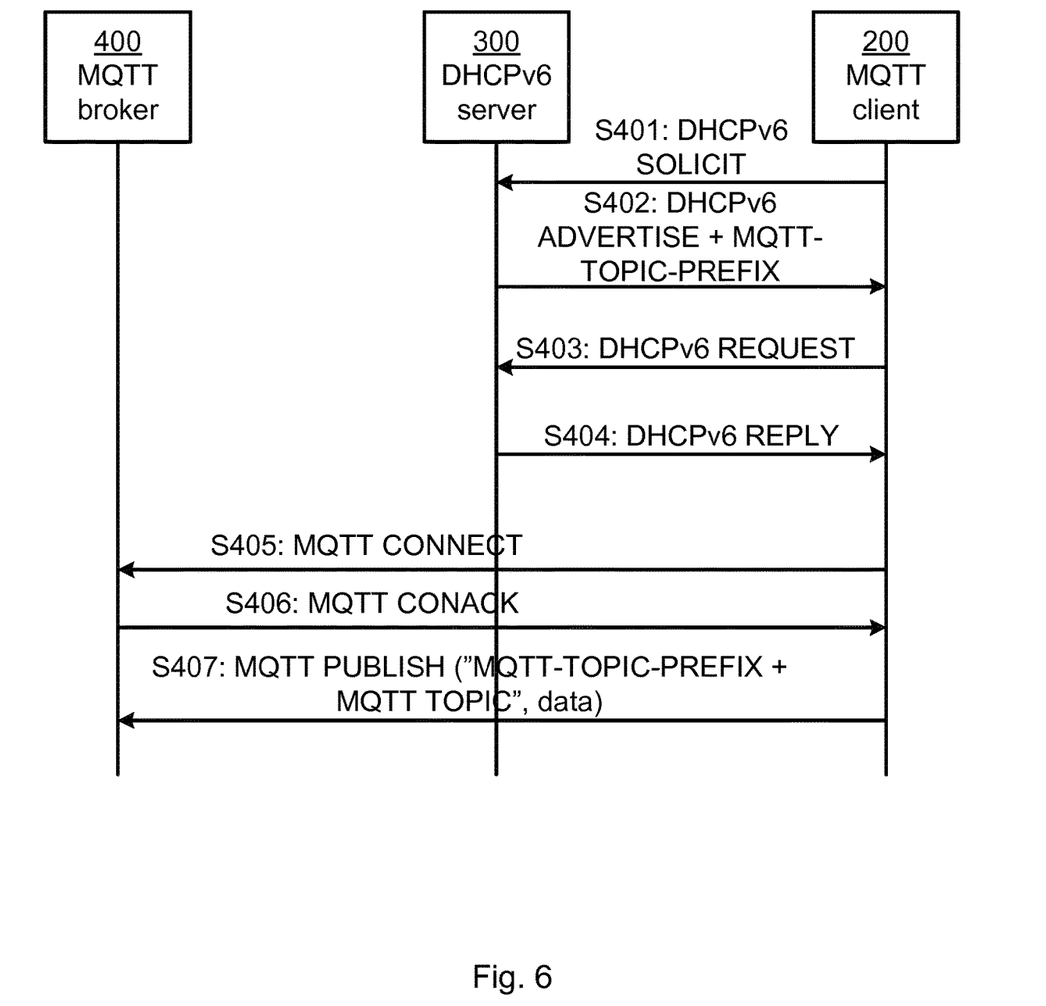
FIGS. 6 and 8 are signalling diagrams according to embodiments.

A first particular embodiment for configuring the MQTT client node 200 with a topic prefix based on at least some of the above disclosed embodiments where the DHCP server 300 is a DHCPv6 server will now be disclosed in detail with reference to the signalling diagram of FIG. 6.

In general terms, the MQTT client node 200 sends a request to the upstream DHCPv6 server 300 for getting a network address.

S401: The MQTT client node 200 sends a DHCPv6 solicit message ("DHCPv6 SOLICIT") to a reserved multicast address to discover the DHCP server 300.

The DHCPv6 server 300 automatically assigns an IPv6 address to the MQTT client node 200. As part of this message exchange the MQTT client node 200 receives options called MQTT_TOPIC_PREFIX.

S402: The DHCP server 300 responds with a DHCPv6 advertise message ("DHCPv6 ADVERTISE") comprising the MQTT_TOPIC_PREFIX.

The DHCP server 300 might add more than one instance of MQTT_TOPIC_PREFIX if there are more than one topic prefix to be delegated to the MQTT client node 200.

S403: If DHCP is used also for stateful IPv6 address assignment, the MQTT client node 200 sends a DHCPv6 request message ("DHCPv6 REQUEST") to the DHCP server 300 for IP address assignment.

S404: The DHCP server 300 responds with a DHCPv6 reply message ("DHCPv6 REPLY") to the MQTT client node 200 with IP address assignment information.

Once the topic prefix delegation is done, the MQTT client node 200 registers itself to the MQTT broker node 400. The MQTT client node 200 uses one of the received topic prefix as prefix to each topic to which it publish data.

S405: The MQTT client node 200 sends an MQTT connect message ("MQTT CONNECT") to the MQTT broker node 400 for registration with the MQTT broker node 400.

S406: The MQTT broker node 400 responds with an MQTT connection acknowledgement message ("MQTT CONACK") to the MQTT client node 200 in case of successful registration.

S407: The MQTT client node 200 request publication of data on a certain topic and sends a message ("MQTT PUBLISH") to the MQTT broker node 400, where the message comprises the MQTT_TOPIC_PREFIX, an MQTT topic ("TOPIC") as well the data to be published.

Figure 7:
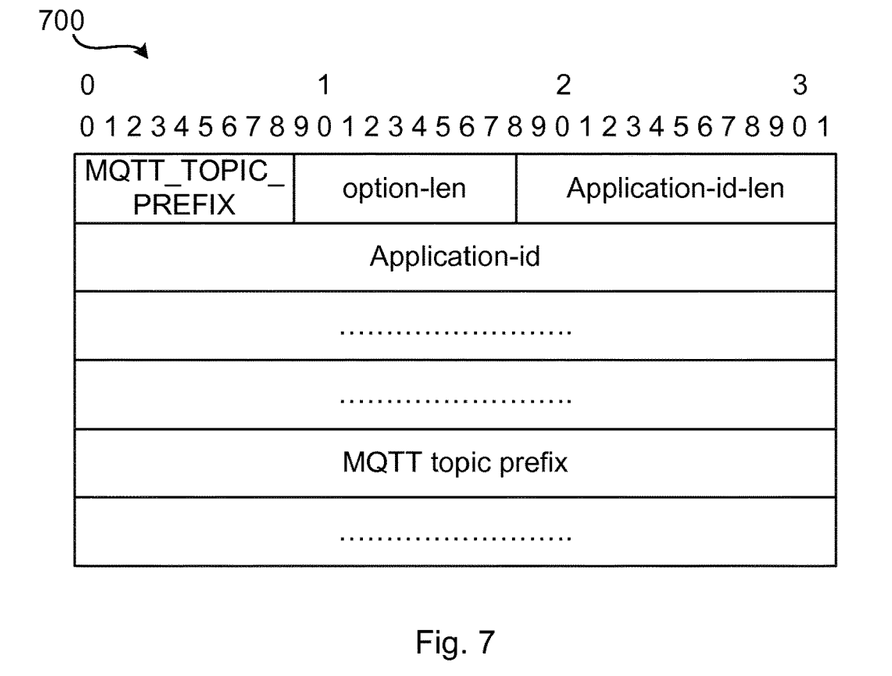

FIG. 7 schematically illustrates a data structure 700 of a response (as in steps S104, S206) from the DHCP server 300 according to an embodiment where the DHCP server 300 is a DHCPv4 server.

Figure 8:
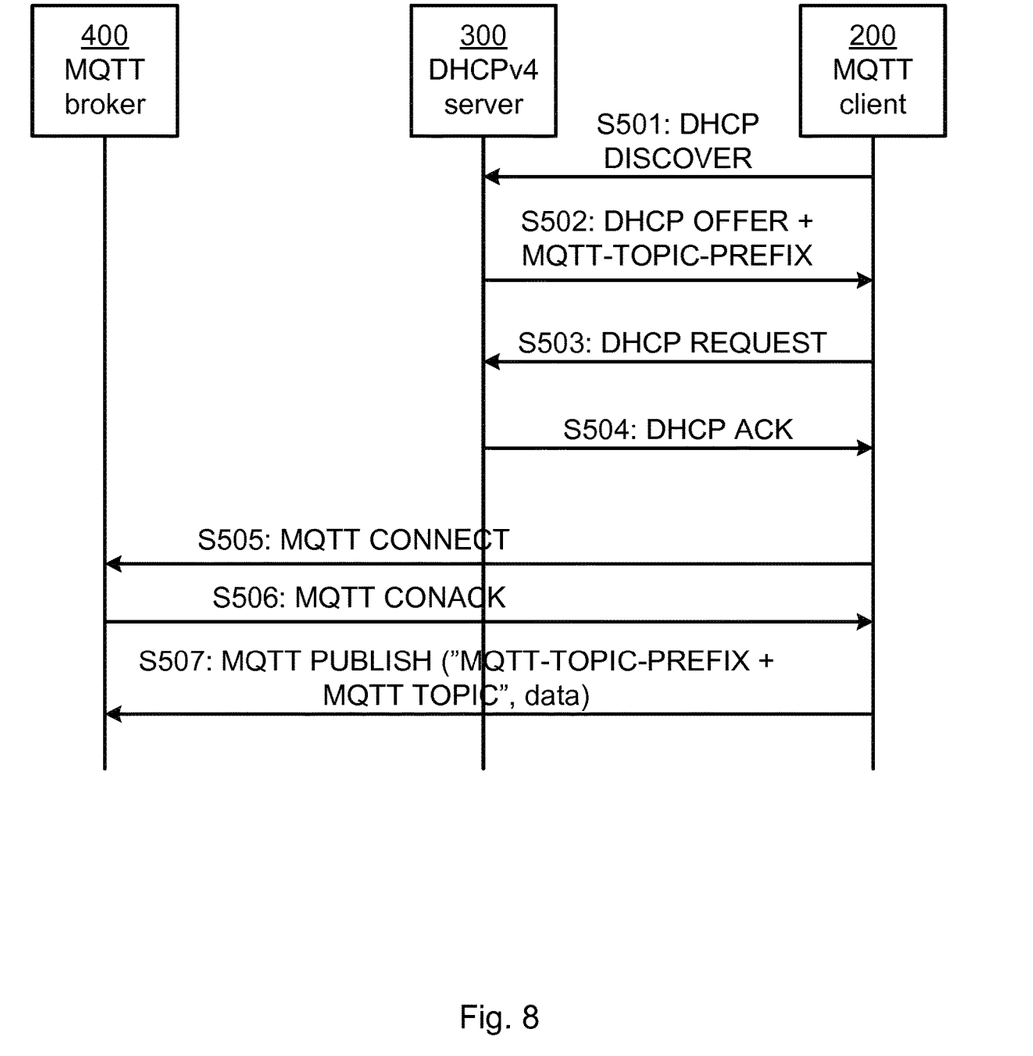

A second particular embodiment for configuring the MQTT client node 200 with a topic prefix based on at least some of the above disclosed embodiments where the DHCP server 300 is a DHCPv4 server will now be disclosed in detail with reference to the signalling diagram of FIG. 8.

In general terms, the MQTT client node 200 sends a request to the upstream DHCPv4 server 300 for getting a network address.

S501: The MQTT client node 200 sends a DHCP discover message ("DHCP DISCOVER") to find the DHCP server 300.

The DHCP server 300 automatically assigns an IPv4 address to the MQTT client node 200. As part of this message exchange the MQTT client node 200 receives options called MQTT_TOPIC_PREFIX.

S502: The DHCP server 400 responds with a DHCP advertise message ("DHCP OFFER") comprising the MQTT_TOPIC_PREFIX.

The DHCP server 300 might add more than one instance of MQTT_TOPIC_PRIFIX if there are more than one topic prefix to be delegated to the MQTT client node 200.

S503: MQTT client node 200 sends a DHCP request message ("DHCP REQUEST") to the DHCP server 300 for IP address assignment.

S504: The DHCP server 300 responds with a DHCP acknowledgement ("DHCP ACK") message to the MQTT client node 200 with IP address assignment information to acknowledge the IP address assignment of the MQTT client node 200.

Once the topic prefix delegation is done, the MQTT client node 200 registers itself to the MQTT broker node 400. The MQTT client node 200 uses one of the received topic prefix as prefix to each topic to which it publish data.

S505: The MQTT client node 200 sends an MQTT connect message ("DHCP CONNECT") to the MQTT broker node 400 for registration with the MQTT broker node 400.

S506: The MQTT broker node 400 responds with an MQTT connection acknowledgement message ("DHCP CONACK") to the MQTT client node 200 in case of successful registration.

S507: The MQTT client node 200 request publication of data on a certain topic and sends a message ("MQTT PUBLISH") to the MQTT broker node 400, where the message comprises the MQTT_TOPIC_PREFIX, an MQTT topic ("TOPIC") as well the data to be published.

FIG. 7 schematically illustrates a data structure 700 of a response (as in steps S104, S206) from the DHCP server 300 according to an embodiment where the DHCP server 300 is a DHCPv4 server.

Reference is now made to FIG. 4 illustrating a method for verifying the MQTT client node's 200 right to publish as performed by the MQTT broker node 400 according to an embodiment.

Any MQTT client node that wishes to publish data on a topic contacts the MQTT broker node 400. Hence, the MQTT broker node 400 is configured to perform step S302:

S302: The MQTT broker node 400 receives a request for publishing data on a topic from an MQTT client node 200. The request comprises a prefix string.

It could be that the MQTT client node 200 has performed a valid registration with the MQTT broker node 400 (as in step S106) and that the MQTT client node 200 has received proper configuration information and at least one prefix string from the DHCP server 300 (as in steps S104, S206). In some aspects the MQTT broker node 400 could thus validate topic prefixes against client identity to determine whether any malicious MQTT client node is trying to publish data using prefix that was served for other valid MQTT client node or not. Hence, the MQTT broker node 400 is configured to perform step S304:

S304: The MQTT broker node 400 validates the prefix string together with an identity of the MQTT client node 200 in order to verify whether the MQTT client node 200 is allowed to publish data on the topic or not.

Embodiments relating to further details of verifying the MQTT client node's 200 right to publish as performed by the MQTT broker node 400 will now be disclosed.

The MAC address can be used as identity of the MQTT client node 200.

According to an embodiment the MQTT client node 200 is not allowed to publish data on the topic as a consequence of the MQTT client node 200 having failed to successfully register with the MQTT broker node 400. That is, where the MQTT client node 200 has not performed any valid registration with the MQTT broker node 400 (as in step S106).

The MQTT broker node 400 could reject publications from a malicious MQTT client node. Particular, according to an embodiment the MQTT broker node 400 is configured to perform (optional) step S306 when the MQTT client node 200 is not allowed to publish data on the topic:

S306: The MQTT broker node 400 rejects the publishing of the data.

Further, an action can be triggered to prevent further registration from the same client identity. Thus, according to an embodiment the MQTT broker node 400 is configured to perform (optional) step S308 when the MQTT client node 200 is not allowed to publish data on the topic:

S308: The MQTT broker node 400 prevents a further attempt by the MQTT client node 200 to register with the MQTT broker node 400.

Detection of malicious clients becomes particularly easy if the DHCP server 300 and the MQTT broker node 400 are running on a common network node (as indicated by dotted lines in FIG. 1) as the functions of both the DHCP server 300 and the MQTT broker node 400 can share the same database to confirm whether an MQTT client node is authorized to publish data on a certain topic. If the DHCP server 300 and the MQTT broker node 400 are running on different network nodes, both these network nodes could be configured with the same mappings between MQTT client node identity and topic prefix.

Figure 9:
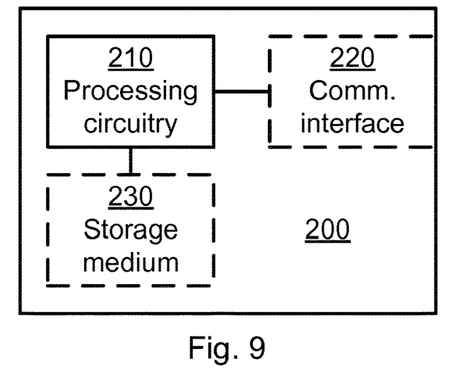
FIG. 9 is a schematic diagram showing functional units of an MQTT client node according to an embodiment.

FIG. 9 schematically illustrates, in terms of a number of functional units, the components of an MQTT client node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1510a (as in FIG. 15), e.g. in the form of a storage medium 230. The processing circuitry 210 may further be provided as at least one application specific integrated circuit (ASIC), or field programmable gate array (FPGA).

Particularly, the processing circuitry 210 is configured to cause the MQTT client node 200 to perform a set of operations, or steps, S102-S108, as disclosed above. For example, the storage medium 230 may store the set of operations, and the processing circuitry 210 may be configured to retrieve the set of operations from the storage medium 230 to cause the MQTT client node 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The MQTT client node 200 may further comprise a communications interface 220 for communications with other entities, nodes, functions, and devices of the communications network 100 of FIG. 1. As such the communications interface 220 may comprise one or more transmitters and receivers, comprising analogue and digital components.

The processing circuitry 210 controls the general operation of the MQTT client node 200 e.g. by sending data and control signals to the communications interface 220 and the storage medium 230, by receiving data and reports from the communications interface 220, and by retrieving data and instructions from the storage medium 230. Other components, as well as the related functionality, of the MQTT client node 200 are omitted in order not to obscure the concepts presented herein.

Figure 10:
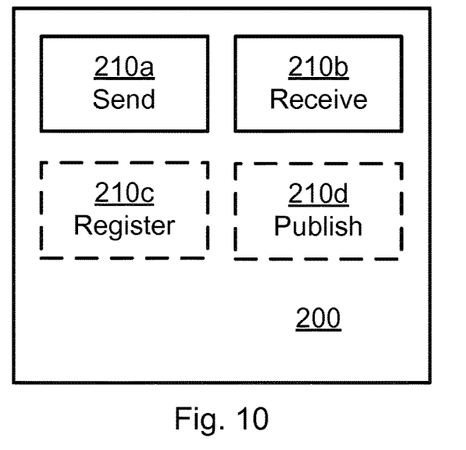
FIG. 10 is a schematic diagram showing functional modules of an MQTT client node according to an embodiment.

FIG. 10 schematically illustrates, in terms of a number of functional modules, the components of an MQTT client node 200 according to an embodiment. The MQTT client node 200 of FIG. 10 comprises a number of functional modules; a send module 210a configured to perform step S102, and a receive module 210b configured to perform step S104. The MQTT client node 200 of FIG. 10 may further comprise a number of optional functional modules, such as any of a register module 210d configured to perform step S106, and a publish module 210d configured to perform step S108. In general terms, each functional module 210a-210d may be implemented in hardware or in software. Preferably, one or more or all functional modules 210a-210d may be implemented by the processing circuitry 210, possibly in cooperation with the communications interface 220 and the storage medium 230. The processing circuitry 210 may thus be arranged to from the storage medium 230 fetch instructions as provided by a functional module 210a-210d and to execute these instructions, thereby performing any steps of the MQTT client node 200 as disclosed herein.

Figure 11:
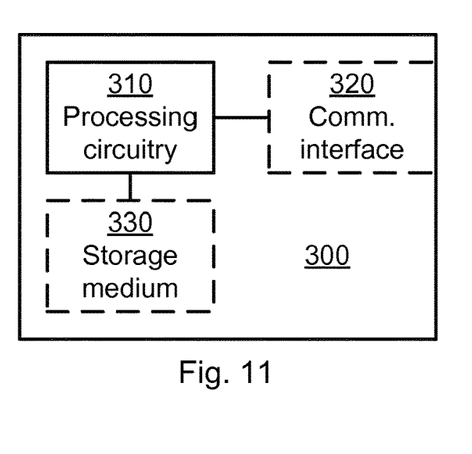
FIG. 11 is a schematic diagram showing functional units of a DHCP server according to an embodiment.

FIG. 11 schematically illustrates, in terms of a number of functional units, the components of a DHCP server 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1510b (as in FIG. 15), e.g. in the form of a storage medium 330. The processing circuitry 310 may further be provided as at least one application specific integrated circuit (ASIC), or field programmable gate array (FPGA).

Particularly, the processing circuitry 310 is configured to cause the DHCP server 300 to perform a set of operations, or steps, S202-S208, as disclosed above. For example, the storage medium 330 may store the set of operations, and the processing circuitry 310 may be configured to retrieve the set of operations from the storage medium 330 to cause the DHCP server 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The DHCP server 300 may further comprise a communications interface 320 for communications with other entities, nodes, functions, and devices of the communications network 100 of FIG. 1. As such the communications interface 320 may comprise one or more transmitters and receivers, comprising analogue and digital components.

The processing circuitry 310 controls the general operation of the DHCP server 300 e.g. by sending data and control signals to the communications interface 320 and the storage medium 330, by receiving data and reports from the communications interface 320, and by retrieving data and instructions from the storage medium 330. Other components, as well as the related functionality, of the DHCP server 300 are omitted in order not to obscure the concepts presented herein.

Figure 12:
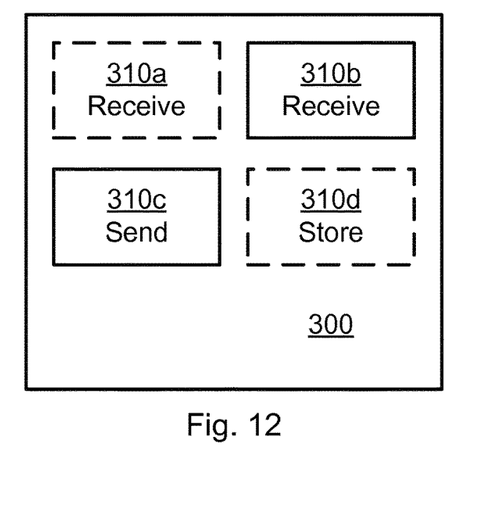
FIG. 12 is a schematic diagram showing functional modules of a DHCP server according to an embodiment.

FIG. 12 schematically illustrates, in terms of a number of functional modules, the components of a DHCP server 300 according to an embodiment. The DHCP server 300 of FIG. 12 comprises a number of functional modules; a receive module 310b configured to perform step S204, and a send module 310c configured to perform step S206. The DHCP server 300 of FIG. 12 may further comprise a number of optional functional modules, such as any of a receive module 310a configured to perform step S202, and a store module 310d configured to perform step S208. In general terms, each functional module 310a-310d may be implemented in hardware or in software. Preferably, one or more or all functional modules 310a-310d may be implemented by the processing circuitry 310, possibly in cooperation with the communications interface 320 and the storage medium 330. The processing circuitry 310 may thus be arranged to from the storage medium 330 fetch instructions as provided by a functional module 310a-310d and to execute these instructions, thereby performing any steps of the DHCP server 300 as disclosed herein.

Figure 13:
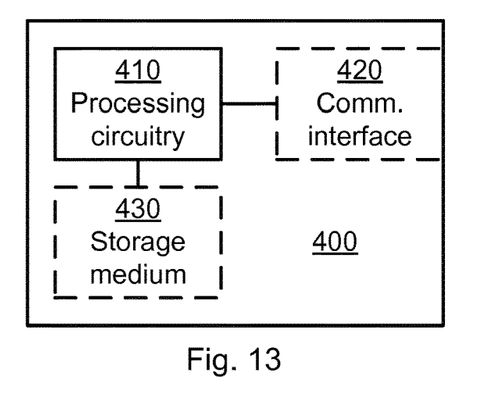
FIG. 13 is a schematic diagram showing functional units of an MQTT broker node according to an embodiment.

FIG. 13 schematically illustrates, in terms of a number of functional units, the components of an MQTT broker node 400 according to an embodiment. Processing circuitry 410 is provided using any combination of one or more of a suitable central processing unit (CPU), multiprocessor, microcontroller, digital signal processor (DSP), etc., capable of executing software instructions stored in a computer program product 1510c (as in FIG. 15), e.g. in the form of a storage medium 430. The processing circuitry 410 may further be provided as at least one application specific integrated circuit (ASIC), or field programmable gate array (FPGA).

Particularly, the processing circuitry 410 is configured to cause the MQTT broker node 400 to perform a set of operations, or steps, S302-S308, as disclosed above. For example, the storage medium 430 may store the set of operations, and the processing circuitry 410 may be configured to retrieve the set of operations from the storage medium 430 to cause the MQTT broker node 400 to perform the set of operations. The set of operations may be provided as a set of executable instructions. Thus the processing circuitry 410 is thereby arranged to execute methods as herein disclosed.

The storage medium 430 may also comprise persistent storage, which, for example, can be any single one or combination of magnetic memory, optical memory, solid state memory or even remotely mounted memory.

The MQTT broker node 400 may further comprise a communications interface 420 for communications with other entities, nodes, functions, and devices of the communications network 100 of FIG. 1. As such the communications interface 420 may comprise one or more transmitters and receivers, comprising analogue and digital components.

The processing circuitry 410 controls the general operation of the MQTT broker node 400 e.g. by sending data and control signals to the communications interface 420 and the storage medium 430, by receiving data and reports from the communications interface 420, and by retrieving data and instructions from the storage medium 430. Other components, as well as the related functionality, of the MQTT broker node 400 are omitted in order not to obscure the concepts presented herein.

Figure 14:
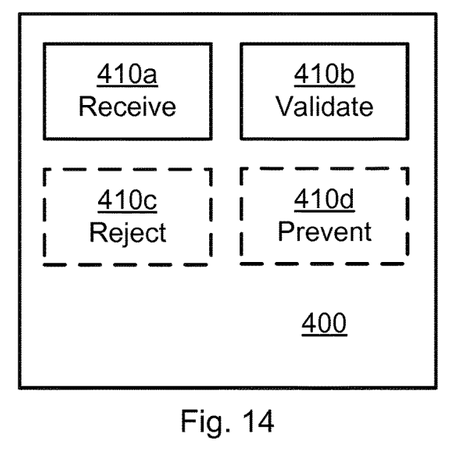
FIG. 14 is a schematic diagram showing functional modules of an MQTT broker node according to an embodiment.

FIG. 14 schematically illustrates, in terms of a number of functional modules, the components of an MQTT broker node 400 according to an embodiment. The MQTT broker node 400 of FIG. 14 comprises a number of functional modules; a receive module 410a configured to perform step S302, and a validate module 410b configured to perform step S304. The MQTT broker node 400 of FIG. 14 may further comprise a number of optional functional modules, such as any of a reject module 410c configured to perform step S306, and a prevent module 410d configured to perform step S308. In general terms, each functional module 410a-410d may be implemented in hardware or in software. Preferably, one or more or all functional modules 410a-410d may be implemented by the processing circuitry 410, possibly in cooperation with the communications interface 420 and the storage medium 430. The processing circuitry 410 may thus be arranged to from the storage medium 430 fetch instructions as provided by a functional module 410a-410d and to execute these instructions, thereby performing any steps of the MQTT broker node 400 as disclosed herein.

Each of the MQTT client node 200, the DHCP server 300, and the MQTT broker node 400 may be provided as a respective standalone device or as a part of at least one further device. Alternatively, functionality of the gateway 200 may be distributed between at least two devices, or nodes. These at least two nodes, or devices, may either be part of the same network part (such as the local network 110) or may be spread between at least two such network parts. Thus, a first portion of the instructions performed by the MQTT client node 200, the DHCP server 300, and the MQTT broker node 400 may be executed in a respective first device, and a second portion of the of the instructions performed by the MQTT client node 200, the DHCP server 300, and the MQTT broker node 400 may be executed in a respective second device; the herein disclosed embodiments are not limited to any particular number of devices on which the instructions performed by the MQTT client node 200, the DHCP server 300, and the MQTT broker node 400 may be executed. Hence, the methods according to the herein disclosed embodiments are suitable to be performed by an MQTT client node 200, a DHCP server 300, and/or an MQTT broker node 400 residing in a cloud computational environment. Therefore, although a single processing circuitry 210, 310 is illustrated in FIGS. 9, 11, 13 the processing circuitry 210, 310, 410 may be distributed among a plurality of devices, or nodes. The same applies to the functional modules 210a-210d, 310a-310d, 410a-410d of FIGS. 10, 12 and 14, and the computer programs 1520a, 1520b, 1520c of FIG. 15 (see below).

Figure 15:
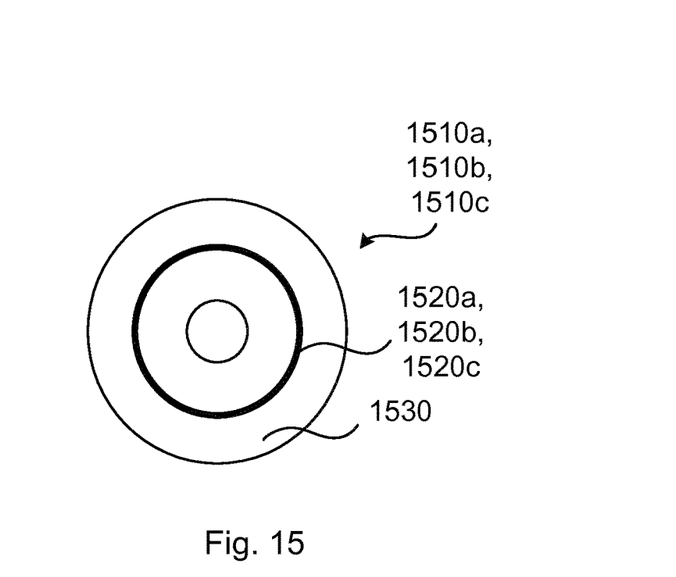
FIG. 15 shows one example of a computer program product comprising computer readable means according to an embodiment.

FIG. 15 shows one example of a computer program product 1510a, 1510b, 1510c comprising computer readable means 1530. On this computer readable means 1530, a computer program 1520a can be stored, which computer program 1520a can cause the processing circuitry 210 and thereto operatively coupled entities and devices, such as the communications interface 220 and the storage medium 230, to execute methods according to embodiments described herein. The computer program 1520a and/or computer program product 1510a may thus provide means for performing any steps of the MQTT client node 200 as herein disclosed. On this computer readable means 1530, a computer program 1520b can be stored, which computer program 1520b can cause the processing circuitry 310 and thereto operatively coupled entities and devices, such as the communications interface 320 and the storage medium 330, to execute methods according to embodiments described herein. The computer program 1520b and/or computer program product 1510b may thus provide means for performing any steps of the DHCP server 300 as herein disclosed. On this computer readable means 1530, a computer program 1520c can be stored, which computer program 1520c can cause the processing circuitry 410 and thereto operatively coupled entities and devices, such as the communications interface 420 and the storage medium 430, to execute methods according to embodiments described herein. The computer program 1520c and/or computer program product 1510c may thus provide means for performing any steps of the MQTT broker node 400 as herein disclosed.

In the example of FIG. 15, the computer program product 1510a, 1510b, 1510c is illustrated as an optical disc, such as a CD (compact disc) or a DVD (digital versatile disc) or a Blu-Ray disc. The computer program product 1510a, 1510b, 1510c could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1520a, 1520b, 1520c is here schematically shown as a track on the depicted optical disk, the computer program 1520a, 1520b, 1520c can be stored in any way which is suitable for the computer program product 1510a, 1510b, 1510c.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for configuring a Message Queue Telemetry Transport, MQTT, client node with a topic prefix, the method being performed by the MQTT client node, the method comprising:
  sending a Dynamic Host Configuration Protocol, DHCP solicit message or a DHCP discover message, wherein the DHCP solicit message or the DHCP discover message comprises a request for configuration;
  after sending the DHCP solicit message or the DHCP discover message, receiving a DHCP advertise message or a DHCP offer message comprising configuration information and at least one prefix string defining the topic prefix to be used together with a topic by the MQTT client node when publishing data on said topic, wherein the DHCP advertise message or the DHCP offer message was sent by a DHCP server; and sending towards an MQTT broker node a publication message, wherein the publication message comprises a topic identifier identifying said topic, data to be published, and the received prefix string as prefix to said topic, and each of the at least one prefix string is provided in an MQTT protocol topic prefix, MQTT_TOPIC_PREFIX, data structure.

2. The method according to claim 1, further comprising:
registering with the MQTT broker node for at least one of publishing and subscribing to data at least on said topic.

3. The method according to claim 1, further comprising:
obtaining from the DHCP server a first unique prefix string for (i) a first application running on the MQTT client node that is to publish data or subscribe to data on said topic or (ii) a first user of the MQTT client node; and obtaining from the DHCP server a second unique prefix string for (i) a second application running on the MQTT client node that is to publish data or subscribe to data on said topic or (ii) a second user of the MQTT client node.

4. The method according to claim 1, wherein each of the at least one prefix string is a cryptographic hash of a medium access control, MAC, address of the MQTT client node.

5. The method according to claim 1, wherein
the DHCP server is an Internet Protocol version six DHCP server, DHCPv6 server,
the request is sent in a DHCPv6 solicit message, and
the response is received in a DHCPv6 advertise message.

6. The method according to claim 1, wherein
the DHCP server is an Internet Protocol version four DHCP server, DHCPv4 server,
the request is sent in a DHCPv4 discover message, and
the response is received in a DHCPv4 offer message.

7. The method of claim 1, wherein the prefix string is unique to the MQTT client node among a plurality of MQTT client nodes.

8. The method of claim 1, wherein
said at least one prefix string comprises a first part and a second part,
the first part defines the topic prefix, and
the second part identifies a particular user of the MQTT client node or a particular application of the MQTT client node.

9. A Message Queue Telemetry Transport, MQTT, client node for configuring the MATT client node with a topic prefix, the MATT client node comprising:

a processing circuitry; and a storage medium storing instructions that, when executed by the processing circuitry, cause the MATT client node to:

send a Dynamic Host Configuration Protocol, DHCP solicit message or a DHCP discover message, wherein the DHCP solicit message or the DHCP discover message comprises a request for configuration;

after sending the DHCP solicit message or the DHCP discover message, receive a DHCP advertise message or a DHCP offer message, the DHCP advertise message or the DHCP offer message comprising configuration information and at least one prefix string defining the topic prefix to be used together with a topic by the MATT client node when publishing data on said topic, wherein the DHCP advertise message or the DHCP offer message was sent by the DHCP server; and send towards an MATT broker node a publication message, wherein the publication message comprises a topic identifier identifying said topic, data to be published, and the received prefix string as prefix to said topic, and each of the at least one prefix string is provided in an MATT protocol topic prefix, MQTT_TOPIC_PREFIX, data structure.

* * * * *